United States Patent [19]

Bennett

[11] 4,169,320

[45] Oct. 2, 1979

[54] LEVELING DEVICE

[76] Inventor: Lewis L. Bennett, 6 Woodleigh Ave., Taylors, S.C. 29687

[21] Appl. No.: 850,261

[22] Filed: Nov. 10, 1977

[51] Int. Cl.² ............................................. G01C 5/04
[52] U.S. Cl. ........................................ 33/367; 33/347
[58] Field of Search ........................... 33/347, 367, 377

[56] References Cited

U.S. PATENT DOCUMENTS

| 1,566,174 | 12/1925 | Tyler | 33/367 |
|---|---|---|---|
| 2,558,004 | 6/1951 | Schmidt | 33/367 X |
| 2,641,061 | 6/1953 | Schmidt | 33/367 X |
| 2,664,645 | 1/1954 | Qualman | 33/377 X |
| 3,048,927 | 8/1962 | Maloof | 33/367 X |
| 3,163,390 | 12/1964 | Nielsen | 33/367 X |
| 3,443,319 | 5/1969 | Dooley | 33/347 |
| 3,949,484 | 4/1976 | Cluley et al. | 33/367 |

*Primary Examiner*—Charles E. Phillips
*Attorney, Agent, or Firm*—Bailey, Dority & Flint

[57] ABSTRACT

A device providing a movable reference point for use in leveling objects such as house trailers and the like which extend over large areas. The device includes a reservoir which is carried on a stand that has a plurality of tubes extending out the bottom thereof. The tubes have magnets carried on the outer ends thereof for readily attaching to the object to be leveled. A screw jack is connected to the reservoir for raising and lowering the reservoir and the level of the liquid therein so as to set the liquid level in the tubes to a desired height. The tubes can be moved around the trailer without affecting the reference point.

5 Claims, 2 Drawing Figures

LEVELING DEVICE

BACKGROUND OF THE INVENTION

Heretofore, in order to level large objects such as trailer homes, normally a four foot liquid level was placed on the floor of the mobile home and the corners of the mobile home were jacked up until a level condition arose. After the mobile home had been leveled, bricks or blocks were laid in columns under the corners for providing supporting posts. Upon the mortar which was used in laying the blocks setting, the trailer was lowered onto the columns. One problem with such a method is that it is difficult to accurately level the trailer with a four foot level since it requires moving the level many times. Another problem is that while the floor of the trailer may have been level prior to the trailer being lowered onto the corner posts, it is necessary that all of the supporting columns or posts be laid to the same height so that when the trailer is lowered onto the posts, it will remain level.

An example of a liquid leveling device is disclosed in U.S. Pat. No. 3,494,202 wherein a level indicator is provided on the blade of a bulldozer for aiding an operator in grading. This device includes a liquid operated meter which indicates the level condition.

Another example of a liquid leveling device is disclosed in U.S. Pat. No. 2,664,645 wherein liquid is carried within a tank and flows through a flexible tube for producing a liquid reference point in another area.

Still another elevation measuring instrument is disclosed in U.S. Pat. No. 2,789,364. This device includes a liquid reservoir in an elongated tube that is used as a hydraulic elevation measuring instrument.

SUMMARY OF THE INVENTION

The present invention relates to an apparatus for producing a liquid reference point and, more particularly, to an apparatus which can provide a level reference point over a large area. The apparatus includes a reservoir which is supported on a stand in a vertical position. A liquid is carried in the reservoir and a vent is provided on top of the reservoir for venting the reservoir to the atmosphere. An elongated tube has one end extending from the bottom of the reservoir and the other end opened to the atmosphere. Means is carried on the other end of the tube for attaching the end of the tube to the object being leveled, and in one particular embodiment, this means includes a magnet. Fluid is carried in the tube and communicates with the fluid in the reservoir so that the level that the fluid extends upwardly in the tube is the same height as the liquid level carried in the reservoir. Means is provided for adjusting the height of the reservoir for raising the level of fluid in the tube and said reservoir to a desired height. Thus, the elongated tube can be readily moved from one place to another while the fluid level therein remains at the same height. Normally, two tubes are utilized and are connected to the reservoir so that one tube can be attached to one corner of, say for example, a mobile home, while the other tube can be attached to another corner.

Accordingly, it is an important object of the present invention to provide an apparatus which readily provides a reference level point for aiding in leveling objects extending over large areas.

Another important object of the present invention is to provide an apparatus wherein a level reference point is capable of being moved over a large area.

Still another important object of the present invention is to provide a simple and accurate device for leveling large objects such as mobile homes and the like.

These and other objects and advantages of the invention will become apparent upon reference to the following specification, attendant claims, and drawing.

DESCRIPTION OF THE PREFERRED EMBODIMENT

Figure 1:
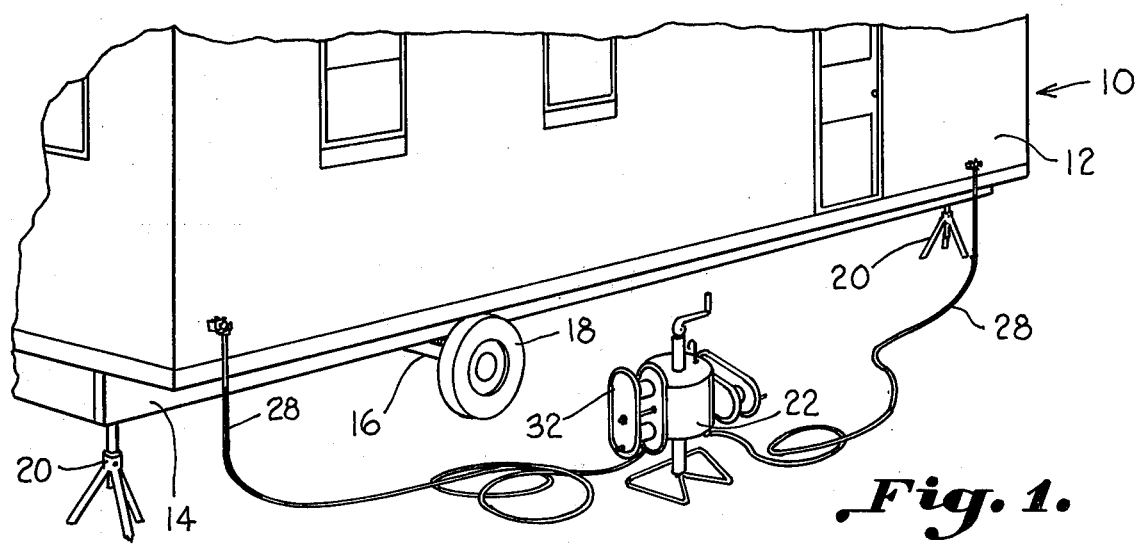
FIG. 1 is a perspective view illustrating a leveling device constructed in accordance with the present invention being used to level a mobile home.
Figure 2:
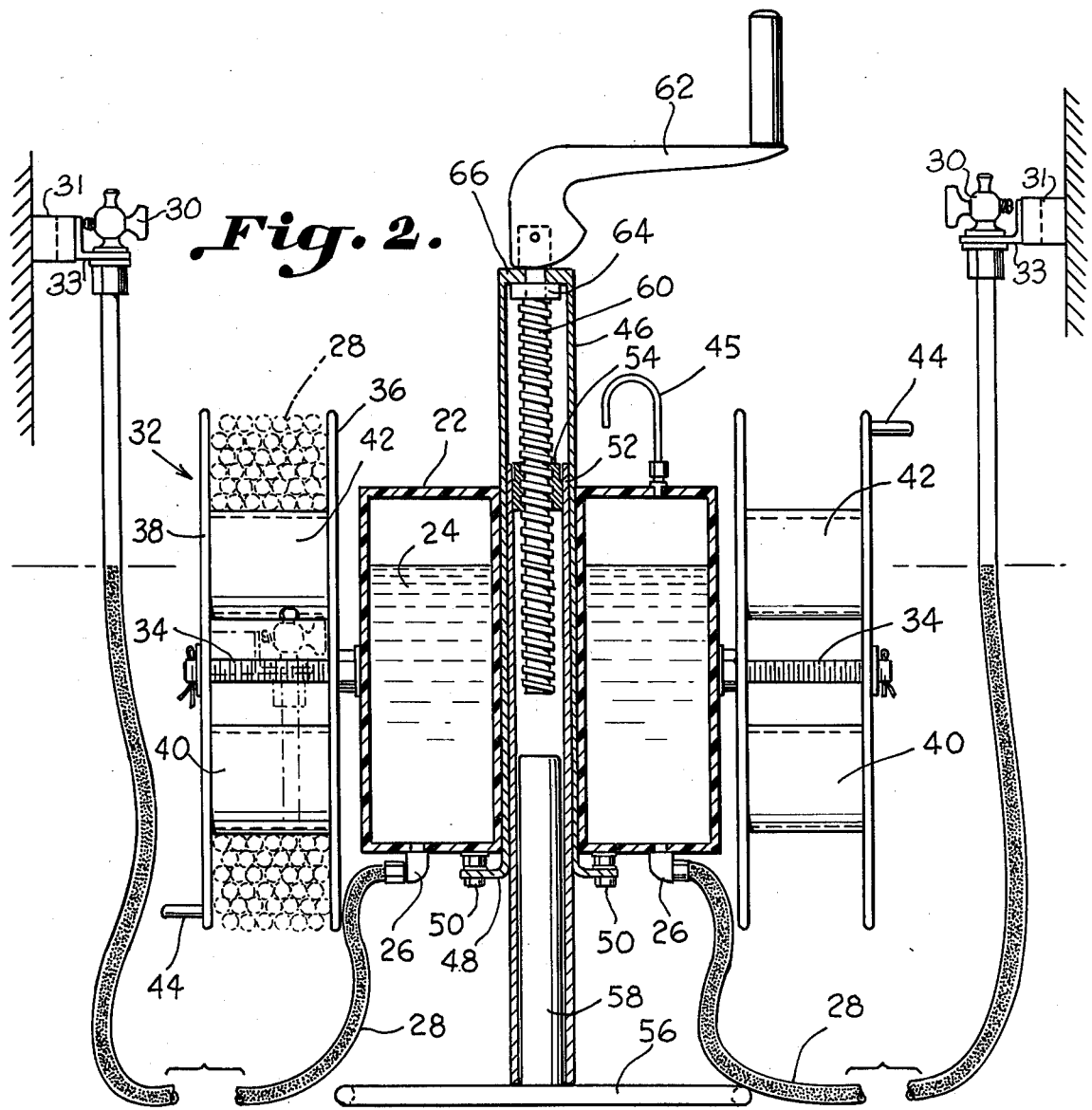
FIG. 2 is a sectional view of the leveling device shown in FIG. 1.

Referring in more detail to FIG. 1 of the drawing, there is illustrated a mobile home generally designated by the reference character 10 which has a sidewall 12. The mobile home 10 is supported on a metallic rectangular shape beam 14 that is, in turn, supported on an axle 16 extending between a pair of wheels 18.

When the mobile home is moved to a new site, it is first jacked up on the corners thereof by means of jacks 20 prior to building the cornerposts which will be utilized for permanently supporting the mobile home. These cornerposts are normally constructed out of concrete block and are laid with mortar. It is important that the height of these cornerposts be on a level plane so that the mobile home, when lowered thereon, will be leveled. These supporting columns are provided at least at the four corners of the mobile home and normally the wheels 18 are off the ground.

While heretofore reference has been made to leveling the mobile home, actually the cornerposts are laid to a predetermined reference height and as a result when the mobile home is lowered thereon, it is level. However, in some circumstances the jacks 20 may be left permanently under the mobile home or trailer, and in those circumstances, the mobile home itself must be leveled.

The apparatus includes a reservoir 22 which is in the form of a cylindrical tank that has a colored liquid 24 carried therein. Fittings 26 are provided adjacent the bottom of the tank 22 upon which one end of a flexible tube 28 is connected. The other end of the flexible tube 28 has a valve 30 connected thereto which, when opened, exposes the tube to the atmosphere. The valve is closed when the tube 28 is wound on a reel 32 when transporting the device. A magnet 31 is secured by means of a bracket 33 to the outer end of the tube 28 so that the end of the tube can be readily attached to any metal structure such as the frame 14 of the house trailer or the sidewall 12 as shown in FIG. 1.

The magnet 31 is also used for securing the end of the tube 28 to a metal plate, not shown, carried on an inner wall of the reel 32 when it is desired to wind the tube 28 on the reel 32.

The reels 32 are rotatably carried on a shaft 34 extending outwardly from a sidewall of the tank 22 and includes a pair of space plates 36 and 38 which are secured in a space relation by means of tubular members 40 and 42 upon which the tube is wound. An outwardly extending handle 44 is provided for rotating the reel when winding the tube 28 thereon. A vent means in the form of an inverted U-shaped tube 45 is carried on top of the tank 22 for venting the tank to the atmosphere.

Means including a screw jack is provided for raising and lowering the tank 22 for changing the level of the liquid 24. The means for raising and lowering the reservoir and, in turn, the liquid level 24 includes a tubular member 46 which has flanges 48 adjacent the bottom thereof that are secured to the bottom of the tank 22 by means of bolts 50. The tubular member 46 extends through a cylindrical bore extending up through the center of the tank 22. Positioned within the tubular member 48 is a sleeve 52 which has a threaded member 54 fixed thereto. The sleeve 52 extends out the bottom of the reservoir and is permitted to move within the outer sleeve 46. A stand including a base member 56 and a vertically extending tubular member 58 extends upwardly within the lower portion of the sleeve 52 and the bottom of the sleeve 52 abuts against the base member 56 for supporting the leveling apparatus.

A threaded screw 60 is carried within the sleeve 46 and threadably engages the threaded member 54. The upper end of the screw 60 has a crank arm 62 provided thereon. A washer 64 is carried on the screw between a top portion 66 of the sleeve 46 and the screw. When the crank arm 62 is rotated depending on the direction of rotation, the screw 60 is raised or lowered within the threaded member 54. This, in turn, causes the tank 22 to be raised and lowered so as to set the level of the liquid 24 carried therein at a predetermined height.

In operation, when it is desired to level an object such as a mobile home, first the mobile home is moved to the desired location. Jacks are then placed under the four corners of the frame 14 upon which the mobile home is carried. The leveling apparatus is positioned adjacent the center of the mobile home and the two tubular members 28 are attached to the mobile home. Normally, the tubular members are attached by means of the magnets 31 to the metallic frame 14 of the mobile home. They can, of course, be attached to any suitable place on the mobile home such as illustrated in FIG. 1 on the sidewalls thereof. The arms 62 are then cranked to raise the liquid level within the tank to a height that is desired for the top surface of the cornerposts. The valves 30 provided on the outer end of the tubular member 28 are opened to the atmosphere and the liquid level within the tubes 28 assumes the same level as that in the tank 22. The jacks 20 are manipulated until the mobile home is positioned to correspond to the level reference point of the liquid provided in the tubes 28. Once one side of the mobile home is level, the tubes 28 are moved to the other side of the mobile home for leveling that side. The tubes 28 can be moved without disturbing the reference level. Cornerposts are laid under each of the corners of the mobile home to the height corresponding to the height of the liquid level within the tube 28. After the mortar between the bricks or concrete blocks has set, the mobile home is lowered on the top thereof providing a permanent level support.

While a preferred embodiment of the invention has been described using specific terms, such description is for illustrative purposes only, and it is to be understood that changes and variations may be made without departing from the spirit or scope of the following claims.

What is claimed is:

1. A portable apparatus providing a plurality of reference points for use in simultaneously leveling objects such as the corners of foundations for house trailers and the like which extend over large areas comprising:

(a) a cylindrical reservoir having an axially disposed vertically extending bore,
    (b) a stand supporting said reservoir in a vertical position including:
        (i) a horizontal base portion, and
        (ii) a post extending upwardly from said base portion into said vertical bore of said reservoir,
    (c) a liquid carried in said reservoir,
    (d) vent means carried on top of said reservoir venting said reservoir to the atmosphere,
    (e) an elongated transparent tube having one end extending from the bottom of said reservoir and having another end opened to the atmosphere,
    (f) fluid carried in said tube communicating with said fluid in said reservoir so that the level that said fluid extends upwardly in said tube is the same height as the liquid level in said reservoir,
    (g) a second elongated transparent tube having one end extending from the bottom of said reservoir and having another end opened to the atmostphere,
    (h) fluid carried in said second tube communicating with said fluid in said reservoir so that said fluid extends upwardly in said second tube to the same height as the liquid level in said reservoir,
    (i) reels rotatably mounted on said reservoir for winding said elongated tubes thereon when not in use,
    (j) means carried on said other end of said tubes for attaching said other ends of said tubes to the object being leveled with said other ends of said tubes being carried above said fluid level in said reservoir, and
    (k) means manually adjusting the height of said reservoir for raising the level of fluid in said tubes and said reservoir to a desired height,
    whereby said elongated tube can be readily moved from one place to another while said fluid level therein remains at the same height.

2. The apparatus as set forth in claim 1 wherein said means for attaching said other end of said tube to said object comprises:

a magnetic member carried on the other end of said tubes, and
    said reels being constructed of magnetic material so that said magnetic members can be readily attached to a respective reel for maintaining said elongated tubes in a wrapped position on said reel when not being used.

3. The apparatus as set forth in claim 1 wherein said means for manually adjusting the height of said reservoir comprises:

(a) a screw jack attached to said housing, and
    (b) means for rotating said screw jack for raising and lowering said reservoir.

4. The apparatus as set forth in claim 1 wherein said means for manually adjusting the height of said reservoir comprises:

(a) a tubular member extending through said bore;
    (b) a sleeve carried in said tubular member;
    (c) a threaded member carried by said sleeve;
    (d) a threaded screw carried on said tubular member threadably engaging said threaded member, and
    (e) means for rotating said threaded screw for raising and lowering said reservoir.

5. The apparatus as set forth in claim 1 further comprising:

a valve carried on said other ends of said tubes for closing said other ends of said tubes when said apparatus is not being used.

* * * * *